United States Patent
Eriksson

(10) Patent No.: US 6,862,197 B2
(45) Date of Patent: Mar. 1, 2005

(54) ARRANGEMENT FOR DEMAGNETIZING A TRANSFORMER

(75) Inventor: Jonas Eriksson, Stenhamra (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 10/470,160

(22) PCT Filed: Jan. 25, 2002

(86) PCT No.: PCT/SE02/00136
§ 371 (c)(1),
(2), (4) Date: Sep. 1, 2004

(87) PCT Pub. No.: WO02/060066
PCT Pub. Date: Aug. 1, 2002

(65) Prior Publication Data
US 2005/0002207 A1 Jan. 6, 2005

(30) Foreign Application Priority Data
Jan. 26, 2001 (SE) .............................. 0100225

(51) Int. Cl.$^7$ ........................................... H02M 3/335
(52) U.S. Cl. .................. 363/21.04; 363/21.06
(58) Field of Search .................. 363/20, 21.01, 363/21.04, 21.06, 21.07, 21.1

(56) References Cited

U.S. PATENT DOCUMENTS 5,805,434 A    9/1998  Vinciarelli et al.
6,038,148 A  *  3/2000  Farrington et al. ...... 363/21.06
6,304,463 B1 * 10/2001  Krugly ..................... 363/21.06
6,314,002 B1 * 11/2001  Qian et al. ................ 363/21.04
6,473,318 B1 * 10/2002  Qian et al. ................ 363/21.16
6,535,400 B2 *  3/2003  Bridge ..................... 363/21.06
6,765,810 B2 *  7/2004  Perry ....................... 363/21.06
2002/0159277 A1 * 10/2002  Matsumoto et al. ..... 363/21.04

FOREIGN PATENT DOCUMENTS

EP    0 618 666 A2    10/1994
WO      00/69057 A1    11/2000

* cited by examiner

Primary Examiner—Adolf Berhane
(74) Attorney, Agent, or Firm—Nixon & Vanderhye, P.C.

(57) ABSTRACT

To demagnetize a transformer (TR) in a single-ended forward DC/DC converter with self-driven synchronized rectifiers (V1, V2) connected across the secondary winding (N2) of the transformer (TR), a diode (D1) is connected in series with a capacitor (C1) across the primary winding (N1) of the transformer. The diode (D1) transfers magnetization energy stored in the transformer to the capacitor (C1) every time a primary switch (V3) of the converter is turned off. To ensure optimum efficiency of the synchronized rectifiers, a discharging circuit is connected to the capacitor (C1) for discharging the magnetization energy stored therein by drawing a DC current (I) from the capacitor (C1) in response to varying input DC voltage such that complete demagnetization of the transformer (TR) always is attained just before turn-on of the primary switch (V3).

2 Claims, 2 Drawing Sheets

ARRANGEMENT FOR DEMAGNETIZING A TRANSFORMER

This application is the U.S. National phase of international application PCT/SE02/00136 filed 25 Jan. 2002 which designates the U.S.

TECHNICAL FIELD

The invention relates generally to forward DC/DC converters and more specifically to an arrangement for demagnetizing, i.e. resetting, a transformer in such converters.

BACKGROUND OF THE INVENTION

FIG. 1 shows an embodiment of a known pulse width modulated single-ended forward DC/DC converter with self-driven synchronized rectifiers V1, V2, illustrated as field effect transistors (FETs), connected across a secondary winding N2 of a transformer TR in the converter.

An output filter comprising an inductor L and a capacitor C is connected across V2 to provide an output voltage U2 across the capacitor C in a manner known per se.

A primary winding N1 of the transformer TR is connected with one of its terminals to a (+) terminal 1 of a source of varying input DC voltage U1, and with its other terminal to the drain of a primary switch in the form of a FET V3. The source of V3 is connected to a (−) terminal 2 of the voltage source U1. The gate of V3 is pulse width modulated such that its duty cycle is varied in response to the varying input voltage U1 to keep the output voltage U2 at a desired value. To accomplish this, the actual value of the output voltage U2 is sensed by a voltage regulator 3 and compared to the desired value of the output voltage, that is set in the voltage regulator 3. In response to differences between the actual value and the desired value, the voltage regulator 3 outputs a control signal to a control circuit 4. In response to the control signal, the control circuit 4 in its turn outputs a pulse width modulated control signal to the gate of V3 to vary the duty cycle of V3 such that the actual value of U2 equals the desired value. During the off period of the primary switch V3, the core of the transformer TR has to be reset to discharge the leakage inductance of the transformer TR.

To reset or demagnetize the transformer TR, a so-called snubber circuit is provided in a manner known per se to absorb energy during the off period of V3. The snubber circuit comprises a series circuit of a diode D1 and a capacitor C1 that is connected in parallel with the primary winding N1 and a resistor R1 which is connected to the terminals of the capacitor C1. When V3 is turned off, energy which has been accumulated in the primary winding N1 of the transformer TR is transferred to the capacitor C1 and dissipated by the resistor R1.

The FETs V1 and V2 are both controlled by the transformer TR in such a manner that V1 is on when V3 is on, while V2 is on when V3 is off. Thus, V2 is on when the transformer TR is being reset. At higher input voltages U1, the on periods of V3 will be shorter. Hereby, the transformer TR will be reset more quickly. This will result in a longer so-called dead time, i.e. the time when there is no voltage across the transformer TR. As a consequence, V2 will not have any gate drive during such times. Instead, its body diode that generates more losses, will conduct. Hereby, the efficiency of the converter will be lower. Also, the presence of dead time means that the primary switch V3 is exposed to higher voltage than necessary.

FIG. 2 is a diagram illustrating the voltage UN1 across the primary winding N1 of the transformer TR versus the time t. The primary switch V3 is turned off at time t1 and is turned on again at time t3. The transformer TR is supposed to have been demagnetized at time t2. Thus, the dead time lasts from time t2 to time t3 in FIG. 2. The dead time depends on the on-time of V3 such that a shorter on-time gives a longer dead time.

To improve the efficiency that is associated with good timing of the secondary switches, it is possible to control the gate drive of V2 from the primary side of the transformer TR. The disadvantages of such a solution are increased complexity and increased costs.

SUMMARY OF THE INVENTION

The object of the invention is to bring about an arrangement for demagnetizing the transformer in a single-ended forward DC/DC converter with self-driven synchronized rectifiers to ensure optimal operation of the synchronized rectifiers and optimal efficiency of the converter.

This is attained by providing the converter with an arrangement for demagnetizing/resetting the transformer such that complete demagnetization of the transformer always is attained just before turn-on of the primary switch.

Hereby optimal operation of the synchronous rectifiers is achieved as well as minimum voltage stress of the primary switch.

BRIEF DESCRIPTION OF THE DRAWING

The invention will be described more in detail below with reference to the appended drawing on which FIG. 1, described above, shows an embodiment of a known single-ended forward DC/DC converter with self-driven synchronized rectifiers, FIG. 2, also described above, is a diagram illustrating the voltage across the transformer in the converter shown in FIG. 1.

DESCRIPTION OF THE INVENTION

Figure 1:
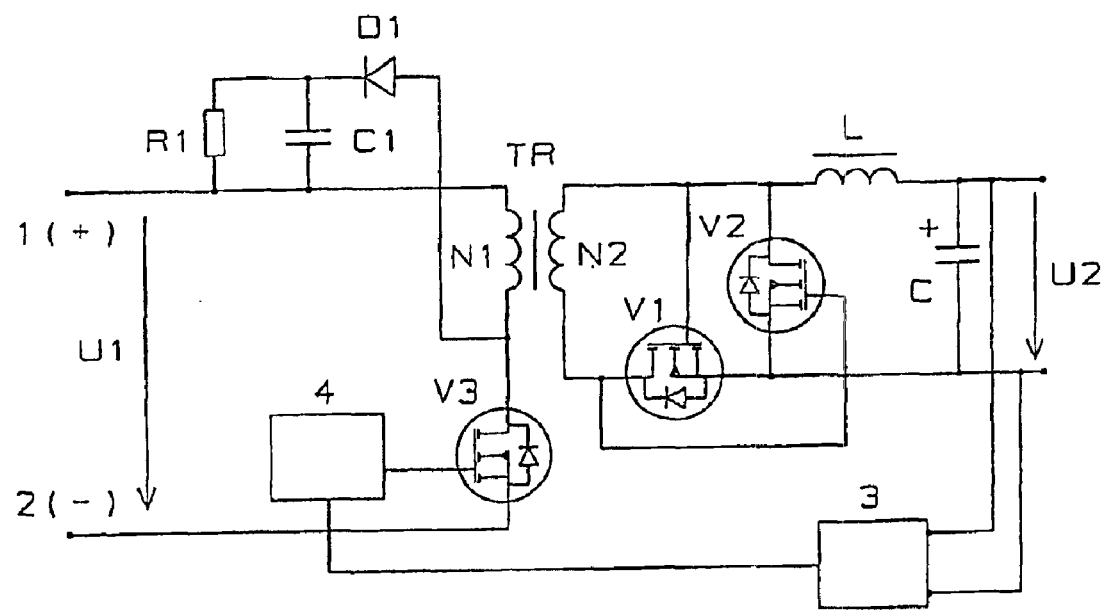
Figure 2:
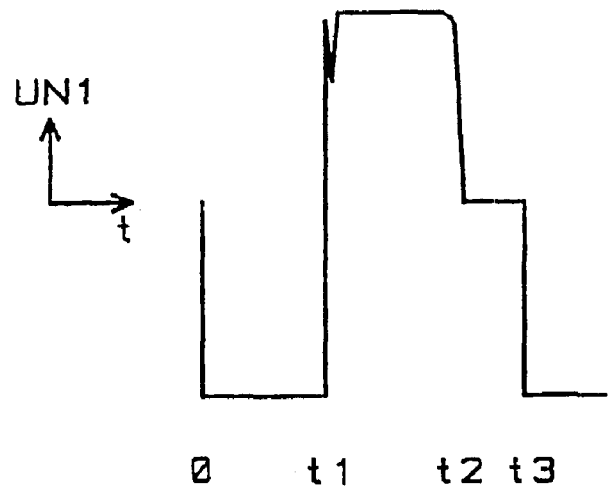
Figure 3:
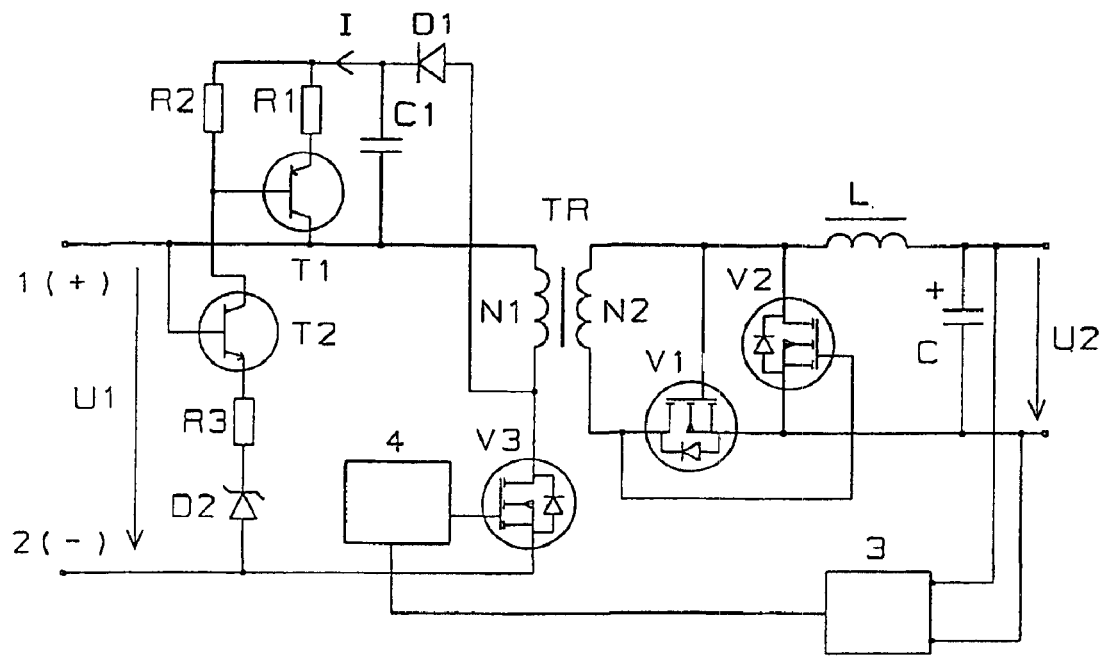
FIG. 3 shows the converter in FIG. 1 provided with an embodiment of a demagnetizing arrangement according to the invention.

In FIG. 3, components that are identical to those in FIG. 1 have been provided with the same reference characters.

To ensure optimum efficiency of the synchronized rectifiers V1, V2 in a single-ended forward DC/DC converter, in accordance with the invention, the converter is provided with an arrangement for demagnetizing/resetting the transformer TR such that complete demagnetization of the transformer always is attained just before turn-on of the primary switch V3. This is called optimum resetting of the transformer TR and is obtained when $t_{on} \cdot U1 = (1-t_{on}) \cdot UC1$, where t,D is the on-time of V3, U1 is the varying input DC voltage, and UC1 is the voltage across the capacitor C1 in the snubber circuit.

FIG. 3 shows an embodiment of such a demagnetizing arrangement comprising a discharging circuit for discharging the capacitor C1 with a current I depending on the input voltage U1. A higher input voltage U1 and a shorter on-time $t_{on}$ of V3 leaves more time for demagnetization of the transformer primary winding N1. Hence the optimum reset voltage UC1 across C1 must be lower. This is achieved by increasing the discharge current I from C1.

The embodiment of the discharging circuit in FIG. 3 comprises a transistor T1 that is connected with its emitter to the cathode of the diode D1 via the resistor RI. The collector of the transistor T1 is connected to the (+) terminal 1 of the source U1. The base of the transistor T1 is connected to the cathode of the diode D1 via a resistor R2, and to the collector of a transistor T2. The base of the transistor T2 is connected to the (+) terminal 1 of the voltage source U1, and the emitter of the transistor T2 is connected to the (−) terminal 2 of the voltage source U1 via a resistor R3 and a zener diode D2.

Figure 4:
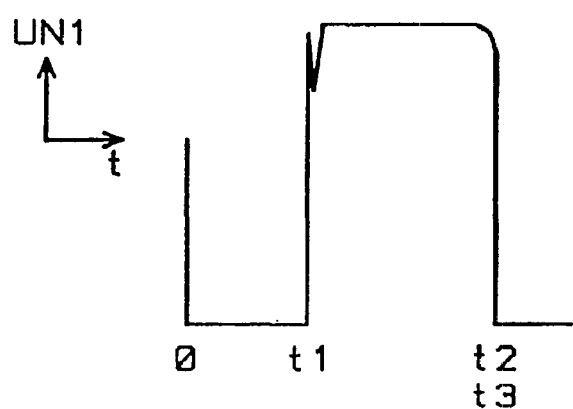
FIG. 4 is a diagram illustrating the voltage across the transformer in the converter shown in FIG. 3.

With reference to FIG. 4, the operation of the discharging circuit in FIG. 3 will be described.

The purpose of the discharge circuit according to the invention is to reduce the voltage UC1 across the capacitor C1 when the input voltage U1 increases. To accomplish this, in accordance with the invention, C1 is discharged with a discharge current $I \approx A \cdot U1 + B$, where A and B are constants.

In the embodiment shown in FIG. 3, supposing that the threshold voltage of the zener diode D2 is UZ, $I \approx (R2/R1) \cdot (U1-UZ)/R3 = U1 \cdot R2/(R1 \cdot R3) - UZ \cdot R2/(R1 \cdot R3)$.

In this case, $A = R2/(R1 \cdot R3)$ and $B = UZ \cdot R2/(R1 \cdot R3)$.

Thus, when the input voltage U1 increases, the discharge current I will increase. At the same time, the on-time of V3 is reduced.

The on-time of V3 lasts from t=0 to t=t1 in FIG. 4. At time t1, the primary switch V3 is turned off. The magnetizing energy in N1, which is kept constant indirectly by the control circuit 4, will be dissipated mainly in the discharging circuit. However a portion of this energy is stored in the stray capacitances of V3, D1 and N1.

When the voltage UN1 across the primary winding N1 of the transformer TR is 0 at time t1, i.e. when the magnetization of N1 ends, the energy in N1 is independent of U1. At this instant, the demagnetization starts.

The stray capacitances loading N1 will be charged, storing some of the magnetization energy. The remaining magnetization energy is stored in C1 and hence dissipated in the discharging circuit according to the invention. The main part of that energy is lost in the transistor T1.

At time t2 in FIG. 4, the diode D1 is reverse biased and the stray capacitances are discharged. The demagnetization ends when the voltage UN1 across the primary winding N1 of the transformer TR is 0 at time t3.

Consequently, complete demagnetization of the transformer TR is attained just before turn-on of the primary switch V3 at time t3.

Thus, by means of the discharging circuit according to the invention, there will be no dead time.

What is claimed is:

1. An arrangement for demagnetization of a transformer (TR) in a single-ended forward DC/DC converter, a primary winding (N1) of the transformer being connected in series with a primary switch (V3) to a source (U1) of varying input DC voltage, a diode (D1) being connected in series with a capacitor (C1) across the primary winding (N1) for transferring magnetization energy from the transformer (TR) to the capacitor (C1) during the off period of the primary switch (V3), and a discharging circuit being connected across the capacitor (C1) in order to dissipate magnetization energy stored therein, characterized in that the discharging circuit comprises means for discharging the capacitor (C1) with such a DC current (I) in response to the varying input DC voltage that complete demagnetization of the transformer (TR) always is attained just before turn-on of the primary switch (V3).

2. The arrangement according to claim 1, characterized in that the discharging circuit comprises a first transistor (T1) connected with its emitter to the cathode of the diode (D1) via a first resistor (R1), with its collector to one terminal (1) of said source (U1), and with its base to the cathode of the diode (D1) via a second resistor (R2), and to the collector of a second transistor (T2) connected with its base to said one terminal (1) of said source (U1), and with its emitter to the other terminal (2) of said source (U1) via a third resistor (R3) and a zener-diode (D2).

* * * * *